US010571090B2

(12) United States Patent
Toko et al.

(10) Patent No.: US 10,571,090 B2
(45) Date of Patent: Feb. 25, 2020

(54) AUTOMOTIVE HEADLIGHT

(71) Applicant: STANLEY ELECTRIC CO., LTD., Tokyo (JP)

(72) Inventors: Yasuo Toko, Yokohama (JP); Ryotaro Owada, Kawasaki (JP); Yoshifumi Takao, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/125,676

(22) Filed: Sep. 8, 2018

(65) Prior Publication Data
US 2019/0078749 A1  Mar. 14, 2019

(30) Foreign Application Priority Data
Sep. 11, 2017  (JP) .................................. 2017-173953

(51) Int. Cl.
*F21S 41/64* (2018.01)
*F21S 41/30* (2018.01)
*G02B 27/28* (2006.01)
*F21S 41/20* (2018.01)

(52) U.S. Cl.
CPC ........... *F21S 41/645* (2018.01); *F21S 41/285* (2018.01); *F21S 41/30* (2018.01); *G02B 27/283* (2013.01)

(58) Field of Classification Search
CPC ........ F21S 41/645; F21S 41/285; F21S 41/30; G02B 27/283
See application file for complete search history.

(56) References Cited

U.S. PATENT DOCUMENTS

| 3,808,422 A | 4/1974 | Handtmann et al. |
| 2003/0071973 A1* | 4/2003 | Hansen ................ G02B 5/3058 353/20 |
| 2003/0112510 A1* | 6/2003 | Florence ............. G02B 5/3058 359/485.05 |
| 2003/0189839 A1 | 10/2003 | Shikano |

(Continued)

FOREIGN PATENT DOCUMENTS

| DE | 102013113807 A1 | 6/2015 |
| DE | 102014113700 A1 | 3/2016 |
| DE | 102015115348 A1 | 3/2017 |

(Continued)

OTHER PUBLICATIONS

The extended European Search Report for the related European Patent Application No. 18193528.9 dated Feb. 20, 2019.

*Primary Examiner* — Donald L Raleigh
(74) *Attorney, Agent, or Firm* — Kenealy Vaidya LLP

(57) ABSTRACT

An automotive headlight includes: a light source for emitting light; a polarization beam splitter for receiving a light flux from the light source, and dividing the light flux into a first polarization and a second polarization; a liquid crystal element disposed to receive the first polarization and the second polarization, divided by the polarization beam splitter; a phase shifter disposed on optical axis of one of the first polarization and the second polarization, and aligning polarization axis directions of the first polarization and the second polarization; and an output side polarizer disposed on output side of the liquid crystal element, wherein illumination regions corresponding to respective control electrodes in the liquid crystal element can be controlled to shield light.

11 Claims, 8 Drawing Sheets

(56) References Cited

U.S. PATENT DOCUMENTS

2014/0175978 A1    6/2014  Kobayashi
2017/0276980 A1*   9/2017  Kauschke ............. F21S 41/135

FOREIGN PATENT DOCUMENTS

| EP | 1351015 A2 | | 10/2003 | |
|----|------------|---|---------|---|
| FR | 2179834 A1 | | 11/1973 | |
| JP | 2005-71731 A | | 3/2005 | |
| JP | 2010-176981 A | | 8/2010 | |
| JP | 2011-243366 A | | 12/2011 | |
| JP | 2013-054849 A | | 3/2013 | |
| KR | 10-0557544 B1 | | 3/2006 | |
| KR | 20180121262 A | * | 11/2018 | ............. F21S 41/00 |

\* cited by examiner

AUTOMOTIVE HEADLIGHT

CROSS REFERENCE TO RELATED APPLICATION

This application is based on and claims the benefit of priority from Japanese Patent Application No. 2017-173953, the entire content of which is incorporated herein by reference.

BACKGROUND OF THE INVENTION

Field

This invention relates to an automotive headlight, and more particularly to an automotive headlight capable of controlling brightness of illumination regions.

Related Art

Most of automotive headlights have capacity of changing high beam illumination capable of illuminating a wide illumination region extending to a far field, without limiting the illumination region, and low beam illumination illuminating a narrow illumination region, limiting the illumination region up to a certain field. The illumination of low beam is done in such a manner that upper portion of the illumination lights is limited so as to shade illuminating lights directed to a region including an upcoming car in the opposite lane, portions lower than a cut off line are illuminated, preventing to give glare to the upcoming car in the opposite lane. Change-over the high beam and the low beam is done by the driver. For example, a cut off line is formed by a light shielding shade. When the shade is driven by mechanical elements, imperfect operation may easily occur.

Japanese Unexamined Patent Application Publication (JPA) 2010-176981 discloses a vehicle headlight as illustrated in FIG. 6A. A light flux L0 emitted from an LED light source 212 is obliquely incident on a first reflection polarizer 214 made of a wire grid polarizer. The first reflection polarizer 214 has a polarization transmission axis including the vertical plane. A first polarized component L1 having vertical polarization axis transmits through the first reflection polarizer 214, and a second polarized component L2 having horizontal polarization axis is reflected upward by the first reflection polarizer 214, and then reflected by a first optical system 220 toward a lens 230.

The first polarized component L1 having vertical polarization axis and transmitted through the first reflection polarizer 214 is incident on a liquid crystal element 216 of vertical alignment (VA) mode. When the liquid crystal element 216 is in the absence of applied voltage, the incident light maintains the polarization direction and transmits the element 216. When the liquid crystal element is in the state of applied voltage, the incident light changes the polarization direction by 90 degrees and transmits the element. First, consideration will be made on the case when the liquid crystal element 216 is in the absence of applied voltage. The polarized component L1 of vertical direction transmitted from the liquid crystal element 216 is obliquely incident on a second reflection polarizer 218 made of a wire grid polarizer.

The second reflection polarizer 218 has a polarization transmission axis including horizontal plane. The polarized component L1 transmitted through the liquid crystal element 216 has a vertical polarization axis, hence cannot transmit the second reflection polarizer 218, hence is reflected upward, and is reflected by a second optical system 222 toward a lens 230. Polarized component L1 having vertical polarization axis and polarized component L2 having horizontal polarization axis are shaped by the shade F, and then are projected through the lens 230. The horizontally polarized component L2 reflected by the first reflection polarizer 214 forms basic distribution pattern P1 (FIG. 6B) through the first optical system 220. The vertically polarized component L1 reflected by the second reflection polarizer 218 forms first additional distribution pattern P2 (FIG. 6C) through second optical system 222.

When the liquid crystal element 216 is in the voltage applied state, the output light from the liquid crystal element 216 is changed to have horizontal polarization axis, to be coincident with the polarization transmission direction of the second reflection polarizer 218, and transmits through the second reflection polarizer 218 to form light flux L3. The light flux L3 is reflected by a third optical system including reflection planes 224 and 226 toward a lens 232. The horizontally polarized component L3 transmitted through the second reflection polarizer 218 forms second additional distribution pattern P3 (FIG. 6D) through the third optical system 224 and 226.

The polarization transmission directions of the first and the second reflection polarizers are in the relation of crossed Nicol prisms. The liquid crystal element 216 in the state of no voltage application functions as a light transmissible medium, transmits the polarized component coming from the first reflection polarizer 214 keeping the vibrating direction, and let it be reflected by the second reflection polarizer 218 of cross Nicol disposition. The liquid crystal element 216 in the state of voltage application functions as a phase shifter, and so changes the vibrating direction that the vibrating direction of the polarized component reaching from the first reflection polarizer 214 becomes coincident with the polarization transmission direction of the second reflection polarizer, and let it transmit the second reflection polarizer 218.

When the liquid crystal element 216 functions as a light transmissible medium, orientation patterns P1 and P2 collectively form a low beam. When the liquid crystal element 216 functions as a phase shifter and rotates the polarization axis direction by 90 degrees, orientation patterns P1 and P3 form a high beam. Low beam and high beam can be switched over by applying a voltage to the liquid crystal element 216 or not, without driving any mechanical elements. When the orientation patterns P1 and P2 form a low beam, two polarized components P1 and P2 reflected by the two reflection polarizers 214 and 218 in the crossed Nicol relation, and having the crossing polarization directions are connected at the boundary.

German Patent Laid-Open application DEA 102013113807 discloses an automotive lighting device as illustrated in FIG. 7. A light flux emitted from a light source 240 is divided by a polarization splitting mirror 250 into two polarization components, transmitted light 252 and reflected light 254. The transmitted light 252 is projected through a liquid crystal element 272, a polarizer 282, and a projection lens 292, and the reflected light 254 is reflected by a reflection mirror 260, and then is projected through a liquid crystal element 274, a polarizer 284, and a projection lens 294. Two polarization components are separated by polarization splitting mirror 250, and the two polarizations having crossed polarization directions are respectively projected through optical systems, each including a liquid crystal element, a polarizer (analyzer), and a projection lens.

In recent years, technology of controlling light distribution in automotive headlight in real time on the front circumstance, i.e. existence or absence of up-coming car and/or foregoing car, and the positions thereof (called adaptive driving beam ADB, etc.) is attracting attention. According to this technology, for example when a car is driving ahead with a driving light distribution, i.e. high beam, and an up-coming car is detected, it becomes possible to decrease lights directed to the region of the up-coming car, among the regions illuminated by the headlights. Affording the driver constantly a field of view approximately equal to the high beam on one hand, it becomes possible on the other hand to avoid giving glare to the up-coming car.

Also, such headlight system capable of adjusting light distribution in the driving-forward direction according to the steering angle (called adaptive front-lighting system AFS, etc.) is becoming generalized. It becomes possible to widen the field of view in the advancing direction, by shifting the light distribution shape according to the steering angle of the steering handle.

The automotive headlight system of such variable light distribution has been realized for example by manufacturing light emitting diode system in which a multiplicity of light emitting diodes (LED) are arranged in array, and controlling on/off and driving current in conducting state of the respective light emitting diodes in real time. For example, there is proposed automotive headlight system provided with an array of a multiplicity of independently switchable LED chips distributed in matrix shape, and a projection lens disposed on optical path of lights emitted from the LED chip array, in which construction is so made that predetermined light distribution pattern can be formed in front side by controlling lighting pattern of the LED chip arrays (for example JPA 2013-54849).

FIG. 8A is a side view of main part of an automotive headlight in which a plurality of light emitting diodes (LED) 212 are disposed in matrix on a supporting substrate 211 having heat dissipating mechanism, and a projection lens 210 is disposed in front.

FIG. 8B is a front view of matrix LED in which a plurality of LEDs 212 are distributed in matrix. Optical system in which light source comprising such plurality of LEDs distributed in matrix is directed to forward direction of the vehicle, and a projection lens is disposed in front position thereof projects brightness distribution of the LEDs forward.

FIG. 8C is a block diagram illustrating schematically a structure of a headlight system. A headlight system 200 comprises a pair of left and right automotive headlights 100, a light distribution control unit 102, a front monitoring unit 104 and so forth. The automotive headlight 100 comprises a light source formed of matrix LEDs, a projection lens, and a housing which houses these elements.

The front monitoring unit 104 connected with the on-vehicle camera 108, a radar 110, a vehicle speed sensor, and so forth, performs image processing on the image data obtained from the sensors, to detect vehicles-in-front (up-coming vehicles and forerunning vehicles), other bright objects on the road and lane marks, and thereby calculates data, such as their attributes and positions, required for the light distribution control. The calculated data is transmitted to the light distribution control unit 102 and various on-vehicles units via an in-vehicle LAN and the like.

The light distribution control unit 102, which is connected to the vehicle speed sensor, the steering angle sensor 114, the GPS navigation 116, high beam/low beam switch 118 etc., determines a light distribution pattern associated with the travelling scene and/or condition based on the attributes (oncoming vehicle, forerunning vehicle, reflector, or road illumination) of the bright objects on the road, their positions (frontward or lateral) and the vehicle speed sent from the front monitoring unit 104. The light distribution control unit 102 determines control amounts of a variable light distribution type headlight required for realizing the light distribution.

The light distribution control unit 102 determines the control contents (on/off of light, thrown power, etc.) of respective LEDs of the matrix LED. The driver 120 converts the information on the control amounts supplied from the light distribution unit 102 into orders adapted to the activities of the drive units and the light distribution control units, and controls them.

SUMMARY

When a matrix LED structure is formed by using a plurality of LED elements, and ADB function is realized by controlling on/off of the LED elements in a desired region, an illumination system having a high reliability would be constructed.

However, controlling on/off of the respective LED elements in the structure of FIG. 8C will necessitates a number of power sources corresponding to the number of LED elements in the matrix LED in the driver 120. The construction becomes complicated, and the manufacturing cost will increase.

When input light is introduced in a polarizer to form a polarized light for use as input polarized light for a liquid crystal element and the rest of the light is disused, the utilization ratio of light becomes low. When input light is divided into two polarized components, and the two polarized components are respectively controlled in liquid crystal elements and combined collectively, it becomes necessary to connect a plurality of projected images at a boundary or the like, and hence it may become difficult to align the projection images at a desired position.

An object of the embodiment is to provide an automotive headlight which realizes light shielding function in a desired region in the field of view and provides a high utilization ratio of light, through receiving a light flux from a light source on a liquid crystal element having a plurality of control regions, and adequately controlling the light transmission state/light shielding state in the respective control regions of the liquid crystal element.

According to an embodiment of the invention, there is provided an automotive headlight comprising:

a light source for emitting light;

a polarization beam splitter for receiving a light flux from the light source, and dividing the light flux into a first polarization and a second polarization;

a liquid crystal element disposed to receive the first polarization and the second polarization, divided by the polarization beam splitter;

a phase shifter disposed on optical axis of one of the first polarization and the second polarization, and aligning polarization axis directions of the first polarization and the second polarization; and an output side polarizer disposed on output side of the liquid crystal element, wherein illumination regions corresponding to respective control electrodes in the liquid crystal element can be controlled to shield light.

Reference symbols: 10 light source, 11 collimate lens, 13 wire grid polarizer, 14 (λ/2) phase shifter, 15 (λ/4) phase shifter, 16 reflector, 17 curved surface reflector, 18 liquid crystal element, 19 (auxiliary) polarizer, 20 polarizer (analyzer), 22 lens, WG wire grid, SUB transparent substrate, 100 automotive headlight, 102 light distribution control unit, 104 front monitor unit, 108 on-vehicle camera, 110 radar, 112 vehicle speed sensor, 114 steering angle sensor, 116 GPS navigation, 118 high beam/low beam switch, 120 driver, 200 headlight system, 210 projection lens, 211 support substrate, 212 LED

DESCRIPTION OF THE PREFERRED EMBODIMENTS

When a plurality of light sources, e.g. LEDs, is to be driven, driving power sources of the same number will be required. It may lead to increase the number of constituent elements, and make the manufacturing cost higher. Automotive headlight utilizing a matrix LED may become hard to be utilized as a headlight for vehicles which are limited in manufacturing cost. Such a structure wherein a liquid crystal element having a plurality of controlling electrodes is disposed in front of a single light source can control light transmissible state/light shielding state of the plurality of regions by the voltages applied to the plurality of regions of the liquid crystal element. Controlling devices utilizing liquid crystal elements having a plurality of control electrodes are being sold at low prices. Now, consideration will be made on controlling light transmissible state/light shielding state of a plurality of regions in a field of view utilizing a liquid crystal element.

Figure 1:
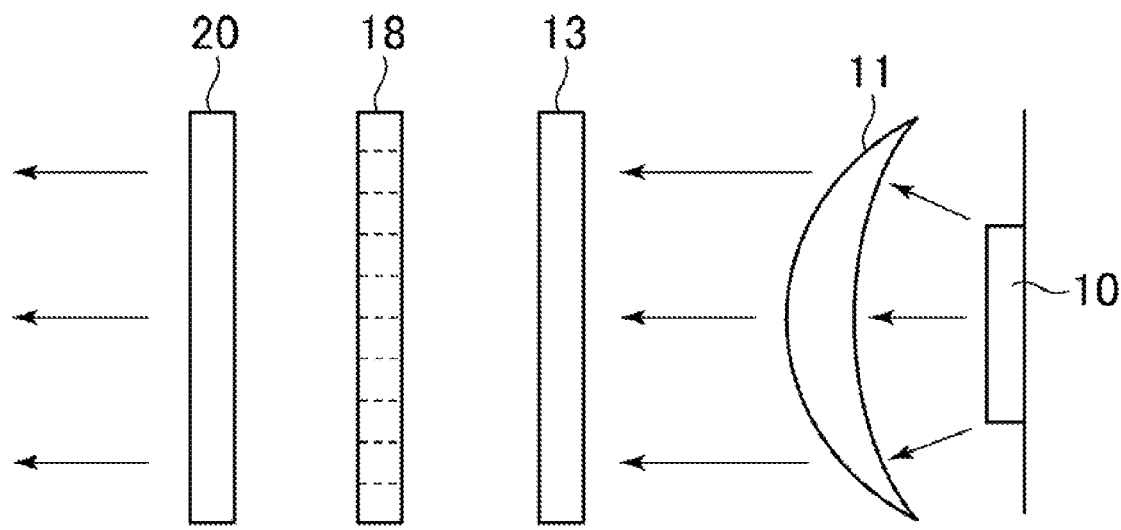
FIG. 1 is a schematic cross section illustrating a headlight provided with a liquid crystal element receiving lights from a single light source and having a plurality of regions capable of controlling shielding of light.

FIG. 1 is a schematic cross section illustrating a structure wherein lights emitted from a single light source is received by a liquid crystal element having a plurality of control regions, and light distribution pattern is controlled by selecting light transmissible state/light shielding state of the respective control regions of the liquid crystal element.

Lights emitted from a light source 10 are collimated by a collimate lens 11, polarized to polarization lights having a polarization axis along a certain direction by an input side polarizer 13, and injected into a plurality of control regions of a liquid crystal element 18. The injected polarized lights receive desired adjustments in the respective control regions of the liquid crystal element 18 depending on the respective control regions (for example, change of polarization axis in selected control regions), then emit from the liquid crystal element 18, and emit through an output side polarizer 20.

Let us suppose that for example, polarizers 13 and 20 are disposed as cross polarizers, and the respective cells of the liquid crystal element are twisted nematic (TN) cells. The liquid crystal layers in the respective cells rotate the polarization axes of incident polarized lights by 90 degrees in the state of no applied voltage, while do not change the polarization axes of the incident polarized lights in the state under voltage application and emit as they were. In cells not applied with a voltage, the polarization axes of the incident lights are rotated by 90 degrees to allow them pass crossed polarizers. In cells applied with a voltage, the polarization axes of the incident lights do not change, and the emitting lights are shielded by the crossed polarizers. Lights emitted from adjusted control regions can be shielded by optionally controlling voltage applications in the cells in the illumination field of view.

Cross polarizers may be exchanged to parallel polarizers and state under no voltage application may be changed to light shielding and state under voltage application may be changed to light transmission. In place of TN cell, vertical alignment (VA) cell may be used. Combination of VA cell treated to align in certain direction and crossed polarizers will realize light shielding in the absence of applied voltage and light transmission under applied voltage. It will be also possible to utilize STN cells and other liquid crystal cells.

The structure in which the light source is simplified and light transmission/light shielding is controlled in a liquid crystal element can extremely simplify the structure of driving power sources. A liquid crystal element having a plurality of regions and an electronic device capable of controlling the liquid crystal element can be available at a low cost. From this point, it is extremely effective for restraining the manufacturing cost of a headlight apparatus.

As illustrated in FIG. 1, a pair of polarizers 13 and 20 may be disposed on input and output sides of a liquid crystal element, polarized input light through the input side polarizer is supplied to the liquid crystal element, and a desired distribution of light is output through the output side polarizer. Those lights blocked from entering into the liquid crystal element by the input side polarizer are usually disused or abolished. The amount of lights transmitted through the input side polarizer is at most half of the total input lights. Utilization ratio of lights becomes low. For increasing the utilization ratio of lights, it is desired to utilize also lights non-selected or blocked by the input side polarizer.

Figure 2A:
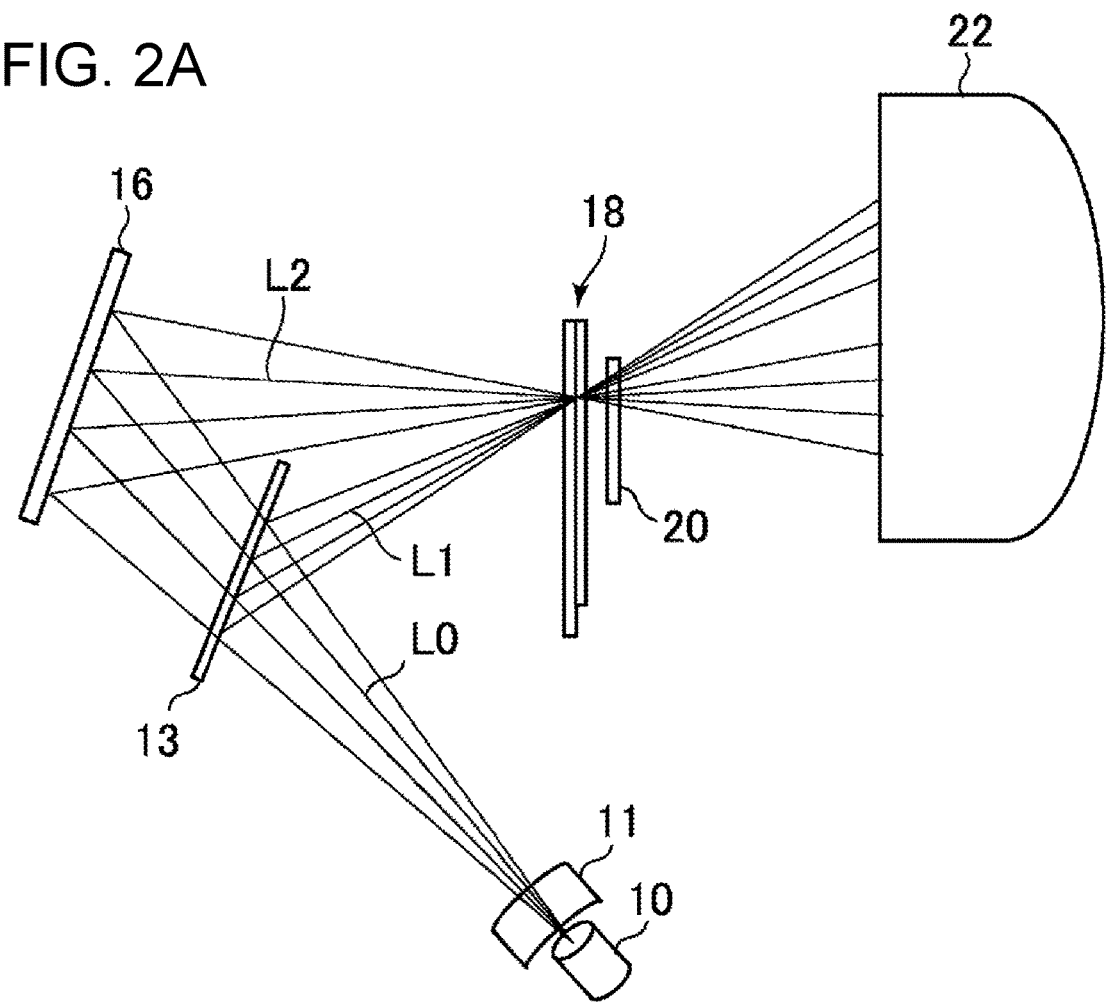
FIG. 2A is a schematic cross section illustrating a structure in which a light flux emitted from a light source is divided into two polarized light fluxes as transmitted light and reflected light of a wire grid polarizer, the two light fluxes are both applied to a liquid crystal element to form a light distribution pattern.

FIG. 2A is a schematic cross section of a structure which utilizes a wire grid polarizer as a polarizer, and the polarized light transmitted through the wire grid polarizer and the polarized light reflected from the wire grid polarizer are both supplied or injected into a liquid crystal element. A light source 10 is formed of a light emitter such as LED. Lights emitted from the light source are collimated by a collimate lens 11 to radiate a wire grid polarizer 13. Lights L1 reflected by the wire grid polarizer 13 are directed toward a liquid crystal element 18, and lights L2 transmitted through the wire grid polarizer 13 are reflected by a reflector 16 and directed toward the liquid crystal element 18. Those two kinds of lights L1 and L2 receive modulation in the liquid crystal element 18, and the content of modulation is made apparent by a polarizer 20 to form light distribution pattern. The light distribution pattern is projected through a projection lens 22.

Figure 2B:
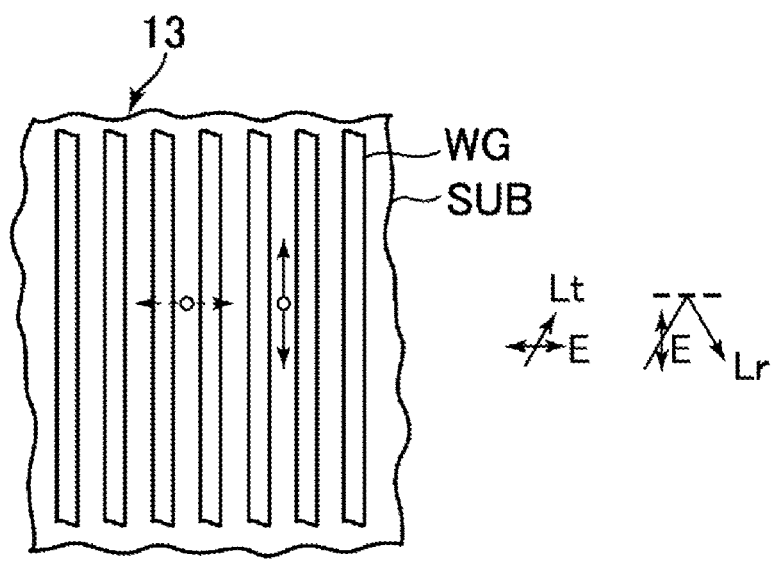
FIG. 2B is a schematic plan view illustrating structure of a wire grid polarizer.

FIG. 2B schematically illustrates a structure of a wire grid polarizer 13. A wire grid polarizer has a structure in which a metal film of parallel stripe shape (wire grids) WG is formed on a surface of a transparent substrate SUB such as a glass plate. Wire grids WG are stripe shaped pattern made of a good electric conductor such as aluminum, disposed for example at a pitch 100 nm-150 nm, and have for example a line-and-space pattern of 1:1 width ratio. The length of the stripe has extremely large size compared to the width size. Electrons in the metal stripe can freely move along the length direction of the stripe to have freedom of motion. But since the width of the stripe is extremely small sized, and electron motion in the width direction is limited, to have no freedom of motion.

Light has an electric vector perpendicular to the propagation direction of light. When the electric vector drives an electron, light is absorbed to consume its energy. When absorption is very strong, light cannot enter into a metal body, and is reflected. When the electric vector does not drive an electron, there is no consumption of energy and light is not absorbed.

Therefore, lights having electric vector along the direction of stripe length of wire grids WG are reflected by the wire grids WG, but lights having electric vector along the width direction of stripe transmit the wire grids WG. Namely, when lights are incident on wire grids WG, reflected polarized lights Lr having electric vector parallel to the wire grids and transmitted polarized lights Lt having electric vector crossing the wire grids WG will be generated. Since wire grids are formed of metal stripes, reflected lights from wire grids formed on a flat surface are considered to be nearly parallel light flux.

In the structure as illustrated in FIG. 2B, stripe direction of the wire grids WG is vertical direction. Therefor, polarized lights having electric vector parallel to the horizontal direction transmit the grids, and polarized lights having electric vector parallel to the vertical direction are reflected. If the stripe direction of the wire grids is set parallel to the horizontal direction, polarized lights having electric vector parallel to the horizontal direction will be reflected, and polarized lights having electric vector parallel to the vertical direction will transmit the grids.

In the structure as illustrated in FIG. 2A, the surface of the wire grid polarizer 13 is so directed that the reflected polarized lights proceed toward the liquid crystal element 18. Transmitted polarized lights are reflected at the reflector 16 to proceed toward the liquid crystal element 18. The liquid crystal element 18 receives first polarized lights L1 reflected at the wire grid polarizer 13 and second polarized lights L2 reflected at the reflector 16. Polarized lights modulated in the liquid crystal element 18 are allowed to transmit cells which are arranged to transmit the light, and are shielded in cells which are arranged to shield the light, according to the contents of modulation, and proved in the polarizer (analyzer) 20. Transmitted lights are projected through a projection lens 22.

Direction of the polarization axis of the polarized lights reflected at the wire grid polarizer 13 and injected into the liquid crystal element 18 and direction of the polarization axis of the polarized lights transmitted through the wire grid polarizer 13, reflected at the reflector 16 and injected into the liquid crystal element 18 are approximately perpendicular to each other. Therefore, modulations caused to the two kinds of polarization in the liquid crystal element 18 will become completely different. It will be difficult to form desired distribution pattern of lights in a state where two kinds of polarizations are mixed. It may be desirable to adjust the polarization directions of the two kinds of polarizations for achieving desired modulation in the liquid crystal element 18. The transmitted polarization and the reflected polarization of a same wire grid polarizer, basically have mutually perpendicular polarization axes. Thus, when one of the polarization axes is rotated by 90 degrees, they will have the same polarization axis directions.

When a linear polarization is injected to a ($\lambda/2$) phase shift plate at an angle of 45 degrees relative to the axial direction of the phase shift plate, a modulated linear polarization having a 90 degrees rotated polarization axis is obtained. Namely, two polarizations having mutually perpendicular polarization axes can be changed into polarizations of the same direction of polarization axis, by transmitting one of the polarizations through a ($\lambda/2$) phase shift plate.

Figure 3A:
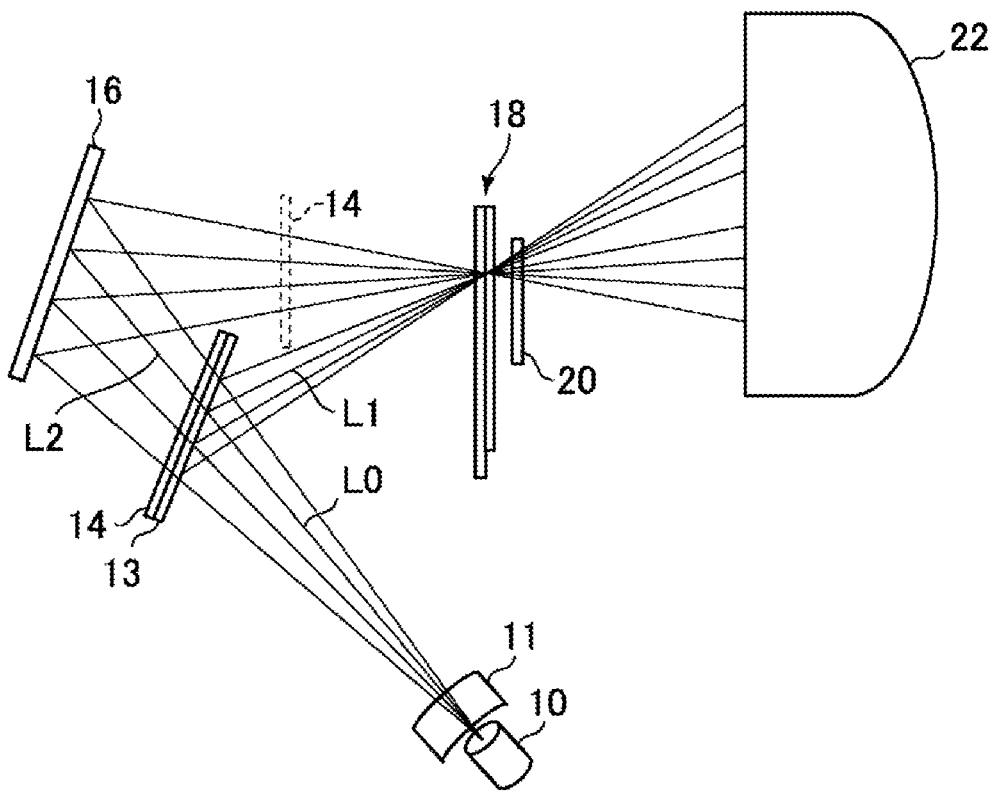
FIGS. 3A and 3B are schematic cross sections of automotive lighting devices according to first and second examples of a first embodiment.
Figure 3B:
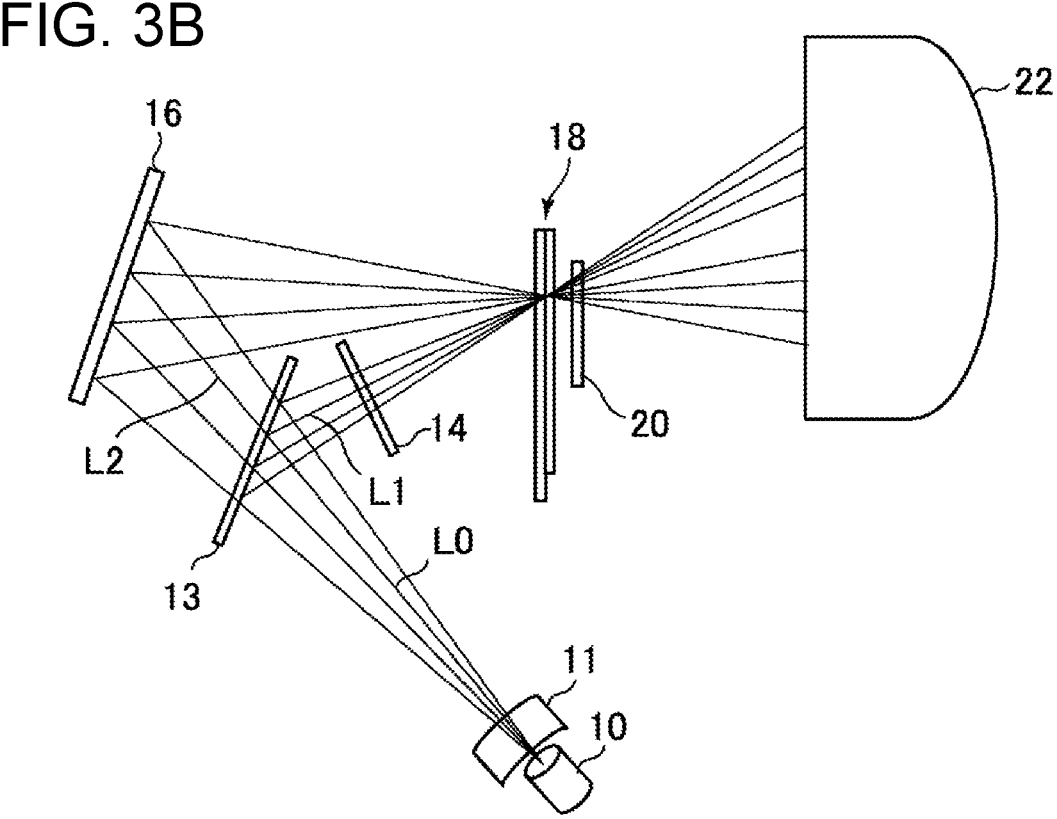

FIGS. 3A and 3B are schematic cross sections of automotive lighting devices according to first and second examples of first embodiment. Similar to the construction illustrated in FIG. 2A, a light source 10 is formed of a light emitter made of LED etc., emitted light flux is collimated by a collimate lens, and irradiate a wire grid polarizer 13. Light flux reflected by the wire grid polarizer 13 is directed toward a liquid crystal element 18, and light flux transmitted through the wire grid polarizer 13 is reflected by a reflector 16 and is directed toward the liquid crystal element 18. The two light fluxes are modulated in the liquid crystal element 18, the content of modulation is made apparent by a polarizer 20, and the light fluxes are projected by a projection lens 22 as distributed light pattern.

In the first embodiment, a ($\lambda/2$) phase shift plate 14 is disposed on an optical axis of the light flux transmitted through or reflected by the wire grid polarizer 13, to rotate the polarization axis by 90 degrees, so that the polarization axes of the transmitted light and the reflected light are aligned or adjusted at the same angle.

In FIG. 3A, a ($\lambda/2$) phase shift plate 14 is positioned or pasted on the output surface of the wire grid polarizer 13, to rotate the polarization axis of the transmitted light by 90 degrees. Polarization axis of light flux (lights) to be reflected by the reflector 16 is rotated by 90 degrees, to become coincident with the polarization axis of polarized light reflected from the wire grid polarizer 13. Therefore, the modulations which the two polarized light fluxes receive in the liquid crystal element 18 become equivalent, and additively combined output can be obtained. Modulated light of increased amount is obtained from the liquid crystal element 18, and output light of the projection lens is also increased.

Both of the polarized light flux L1 reflected by the wire grid polarizer 13, and the polarized light flux L2 transmitted through the wire grid polarizer 13 experience, from emission from the light source to the injection into the liquid crystal element, reflection of one time in the same sense (rightward). Therefore, merit of uniformalized optical characteristics can be provided.

Alternatively, reflection may be leftward. The ($\lambda/2$) phase shift plate 14 may be disposed at any position between output surface of the wire grid polarizer 13 and the input surface of the liquid crystal element 18. For example, it may be disposed between the reflector 16 and the input surface of the liquid crystal element 18, as illustrated by broken line.

In FIG. 3B, the (λ/2) phase shift plate 14 is positioned between the reflection plane of the wire grid polarizer 13 and the input plane of the liquid crystal element 18. Light flux L2 transmitted through the wire grid polarizer 13 has electric vector with a direction perpendicular to the stripe extending direction of the wire grid WG, is reflected by the reflector 16, and propagate toward the liquid crystal element 18. Light flux having electric vector parallel to the stripe extending direction of the wire grid polarizer 13 is reflected by the wire grid WG, and propagates toward the (λ/2) phase shift plate 14. The (λ/2) phase shift plate 14 rotates the polarization axis of the reflected polarized light flux by 90 degrees to shift the polarization axis direction to have the same polarization axis direction as the light flux transmitted through the wire grid polarizer 13. Both light fluxes are injected into the liquid crystal element 18. Two polarized light fluxes having the same polarization direction receive equivalent modulation in the liquid crystal element 18, and the output light flux will have increased light amount.

Both of the polarized light L1 reflected by the wire grid polarizer 13, and the polarized light L2 transmitted through the wire grid polarizer 13 experience, from emission from the light source to the injection into the liquid crystal element, reflection of one time in the same sense (rightward). Therefore, merit of uniformalized optical characteristics can be provided. Alternatively, reflection may be leftward. Similar phenomena hold also in the following structures.

In the first and second examples of the first embodiment illustrated in FIGS. 3A and 3B, one of two kinds of polarized light fluxes formed by a wire grid polarizer is once transmitted through a (λ/2) phase shift plate, to rotate the polarization axis by about 90 degrees, to make two linearly polarized light fluxes of aligned polarization direction.

Figure 4A:
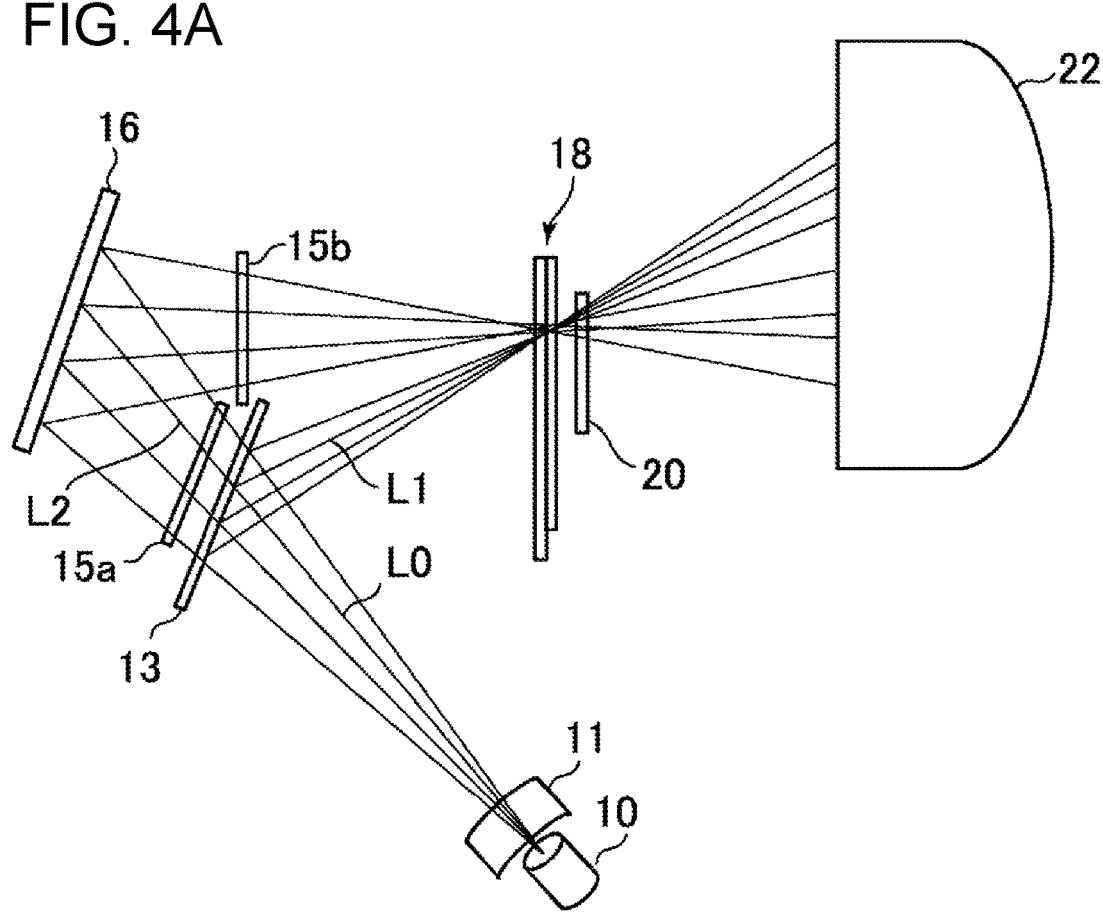
FIG. 4A is a schematic cross section of an automotive lighting device according to a second embodiment.

FIG. 4A is a schematic cross section of an automotive lighting device according to a second embodiment. In the figure, light source 10, collimate lens 11, wire grid polarizer 13, reflector 16, liquid crystal element 18, projection lens 22 are similar to those illustrated in FIGS. 3A and 3B. In this structure, in place of one (λ/2) phase shift plate 14, one (λ/4) phase shift plate 15a is disposed between the wire grid polarizer 13 and the reflector 16, and another (λ/4) phase shift plate 15b is disposed between the reflector 16 and the liquid crystal element 18. Serially disposed two (λ/4) phase shift plates perform function of one (λ/2) phase shift plate by aligning the axial direction. Thus, one (λ/4) phase shift plate 15a and another (λ/4) phase shift plate 15b co-operate to work as one (λ/2) phase shift plate to provide similar effect as those in the structure of FIG. 3A.

Figure 4B:
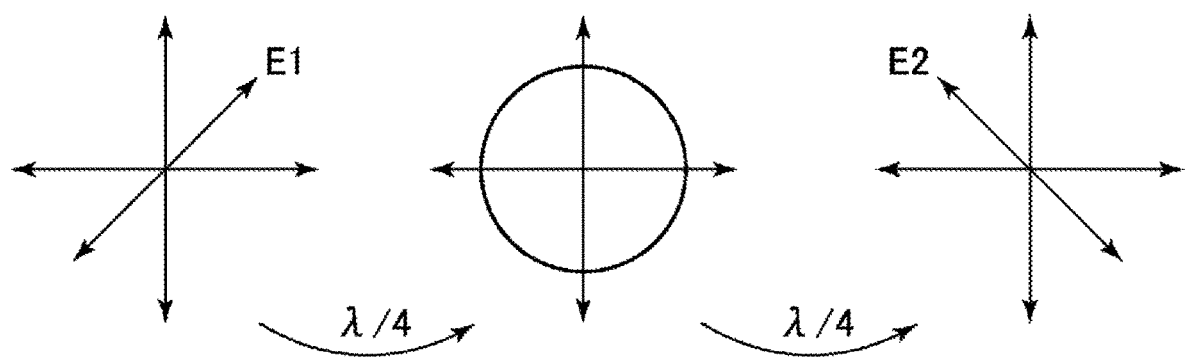
FIG. 4B is a diagram illustrating changes in polarization state by two quarter wavelength (λ/4) phase shifters disposed on an optic axis of a linear polarized light.

Referring to FIG. 4B, analysis will be made on the function of two (λ/4) phase shift plates. Axial directions of (λ/4) phase shift plates are set along x-axis and y-axis, and the polarization direction E1 of incident linear polarization is set at 45 degrees relative to x-axis and y-axis (left part of FIG. 4B). When the incident linear polarization is injected to the first (λ/4) phase shift plate, a phase shift of (λ/4) is generated between the x-component and the y-component of the polarized light (let us assume that x-component is delayed by (λ/4)), and the two (x and y) light components having a phase difference of (λ/4) constitute circular polarization (central part of FIG. 4B). When this circular polarization is injected into the second (λ/4) phase shift plate, the x-component is further delayed by (λ/4), then the two light components constitute a linearly polarized light E2 having a polarization axis rotated by 90 degrees (right part of FIG. 4B).

In case when a reflector has a surface of three dimensional structure, there may be various reflection surfaces of different orientations. When a linearly polarized light flux is reflected by a three dimensional structure surface, the polarization axes of reflected lights (collectively a light flux) become disturbed or multi-directional. When circular polarization light is reflected by a three dimensional structure surface, circular polarization light is reflected irrespective of the direction of the reflection surface. If a linearly polarized light is changed into a circular polarization before reflection, and the circular polarization is revived into a linear polarization after reflection, linear polarization lights of uniform polarization axes can be provided.

Figure 5A:
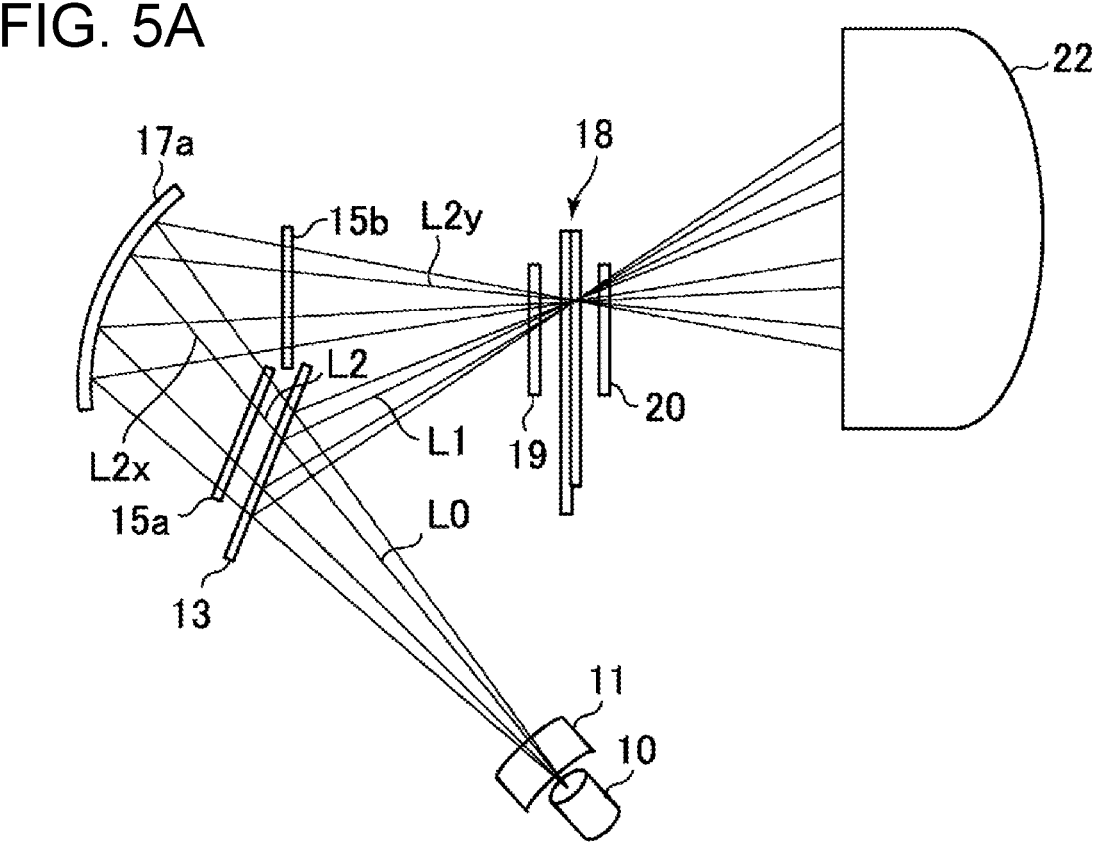
FIGS. 5A and 5B are schematic cross sections of automotive lighting devices according to first and second examples of a third embodiment.
Figure 5B:
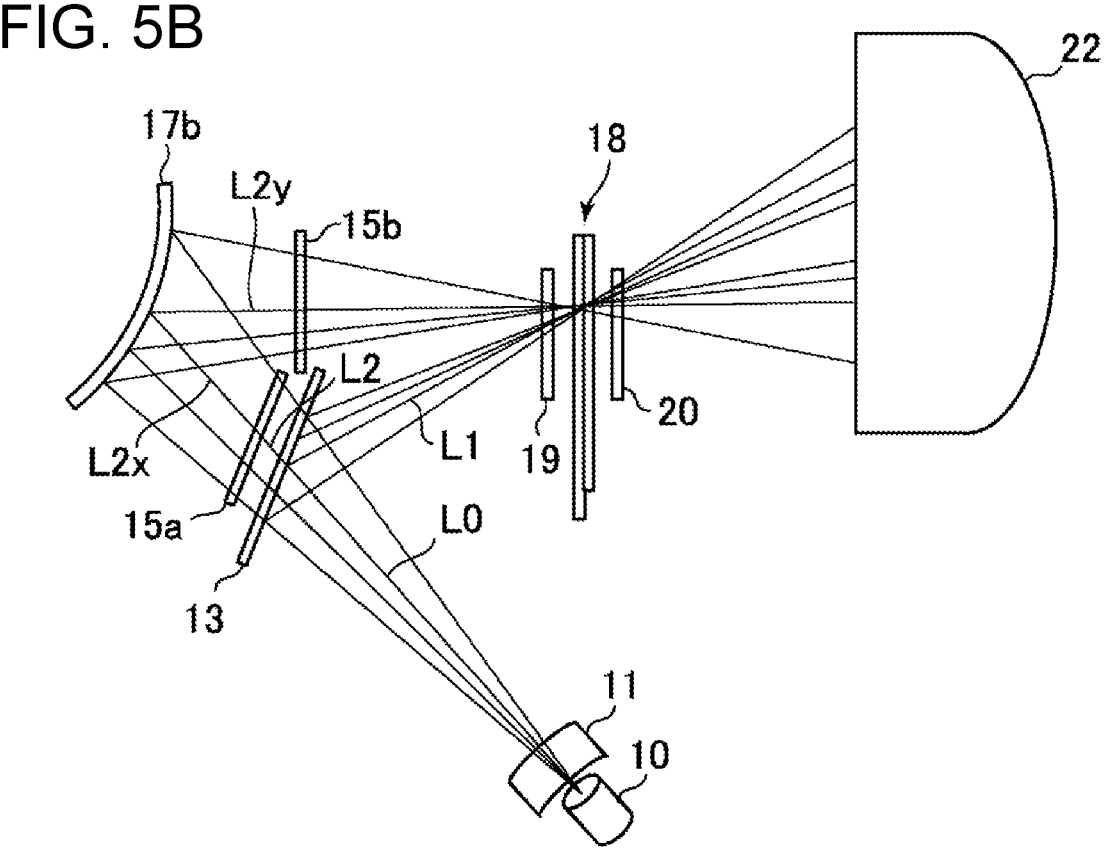
Figure 6A:
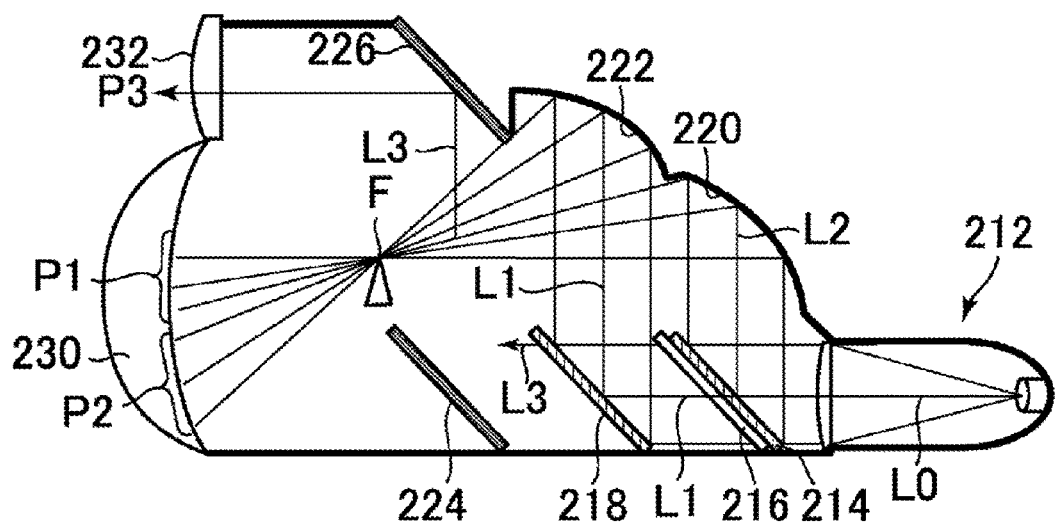
FIG. 6A is a schematic cross section of a conventional automotive lighting device.
Figure 6D:
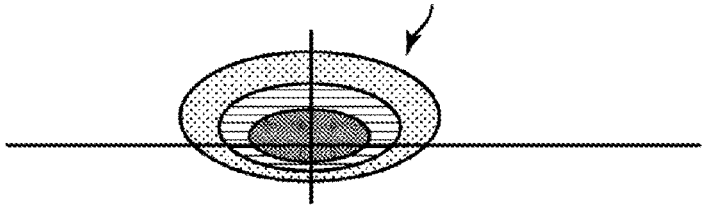
FIGS. 6B, 6C, and 6D are plan views illustrating three light distribution patterns formed by the lighting device of FIG. 6A.
Figure 6C:
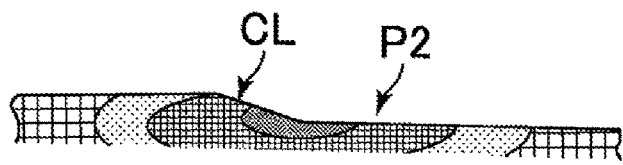
Figure 6B:
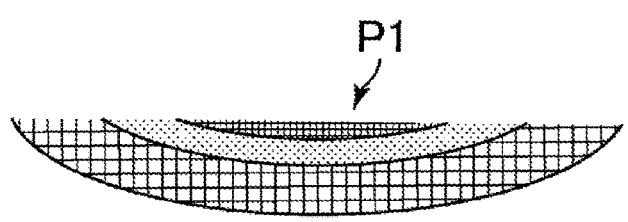
Figure 7:
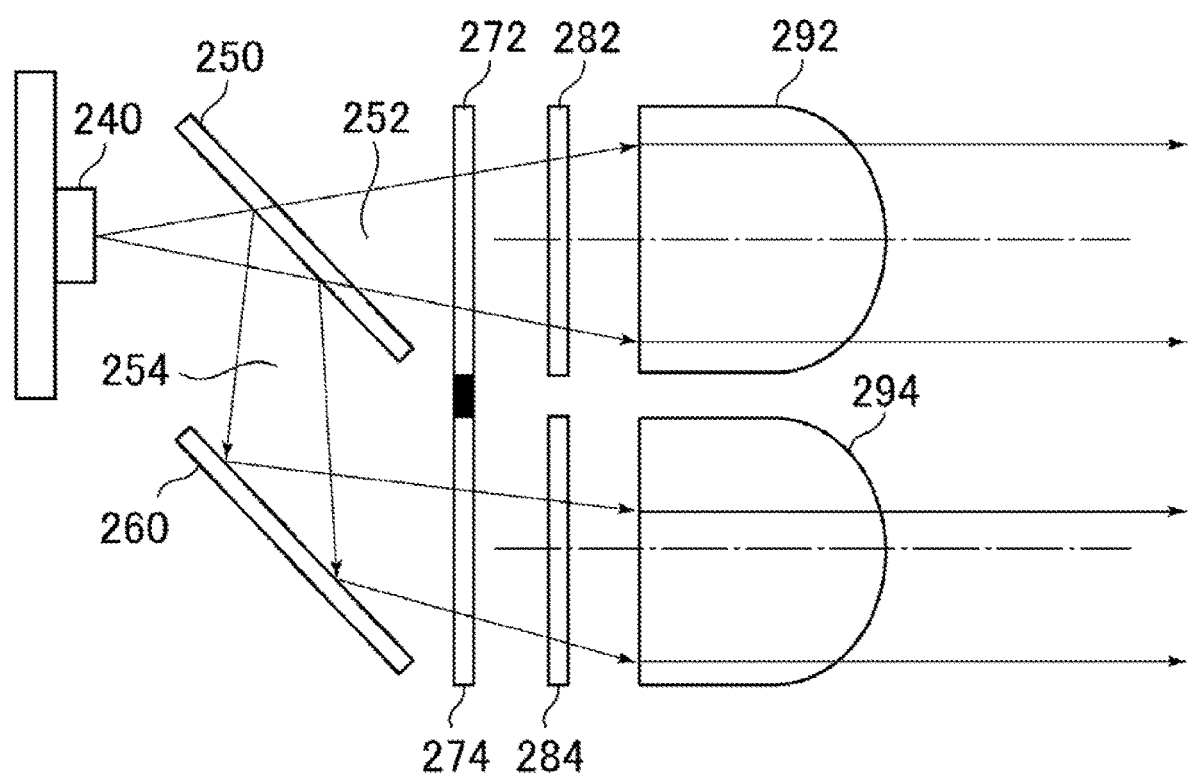
FIG. 7 is a schematic cross section of another conventional automotive lighting device.

FIGS. 5A and 5B are schematic cross sections illustrating automotive lighting devices according to first and second examples of third embodiment. In FIG. 5A, lights emitted from the light source 10 are collimated by a collimate lens 11, and then are obliquely incident on a wire grid polarizer 13. Those linear polarization components having electric vectors along extending direction of the stripe shaped wire grid WG of the wire grid polarizer 13 are reflected by the wire grid polarizer 13, transmitted through an auxiliary polarizer 19, and are injected into a liquid crystal element 18.

Those linear polarization components having electric vectors along directions perpendicular to the extending direction of the stripe shaped wire grid WG of the wire grid polarizer 13 transmit through the wire grid polarizer 13 and go into a first (λ/4) phase shift plate 15a, where they are changed into circular polarization, then reflected by a reflector 17a, and then go into a second (λ/4) phase shift plate 15b, where they are changed from circular polarization into linear polarization (having a phase 90 degrees different from the linear polarization transmitted through the wire grid polarizer 13) (linear polarizations having polarization axis equivalent to linear polarization reflected from the wire grid polarizer 13), transmit through the auxiliary polarizer 19, and then go into the liquid crystal element 18.

The reflector 17a has a reflection surface with three dimensionally curved surface. When a linear polarization is incident on the reflector 17a, polarization axes of the reflected lights may have various directions depending on the direction of the reflecting surface. Even when an incident linear polarization is transmitted through a (λ/2) phase shift plate to rotate the polarization axis, those lights reflected from the reflector 17a may have polarization directions shifted from that of the polarization light reflected from the wire grid polarizer 13. When an auxiliary polarizer is disposed before the liquid crystal element 18, polarization axes of the two kinds of incident lights in the liquid crystal element can be suppressed, and loss is generated. Circular polarization is kept to be circular polarization even when reflected by a three dimensional surface, and the characteristics do not change. When a first (λ/4) phase shift plate 15a and a second (λ/4) phase shift plate 15b are disposed before and after the reflection by the reflector 17a, reflection by a curved surface is achieved in the state of circular polarization, and the characteristics do not change. As a total polarization axis is rotated by 90 degrees.

The reflector 17a illustrated in FIG. 5A is illustrated as a three dimensional concave surface which has a function of condensing incident lights. A reflector 17b illustrated in FIG. 5B is illustrated as a three dimensional convex surface which has a function of dispersing incident lights. A reflector may be partly concave and partly convex.

Figure 8A:
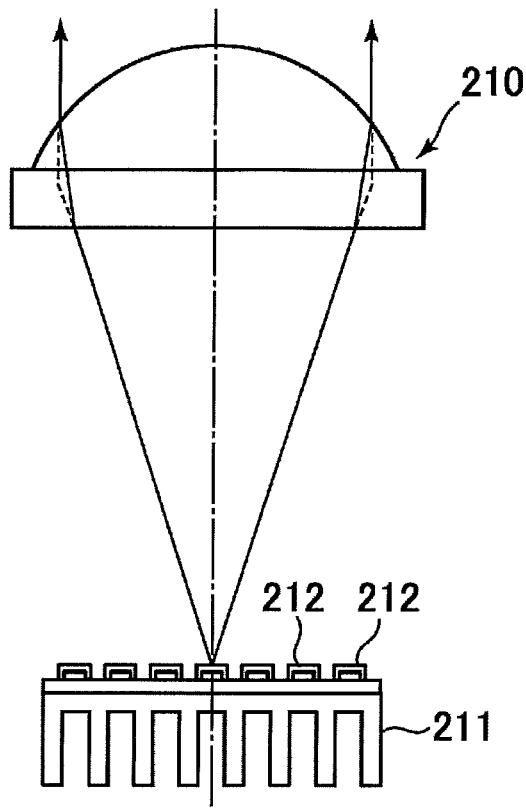
FIGS. 8A, 8B, and 8C are a side view of main part of automotive headlight, a plan view of a light emitting diode array, and a block diagram of the automotive headlight system according to another conventional art.
Figure 8B:
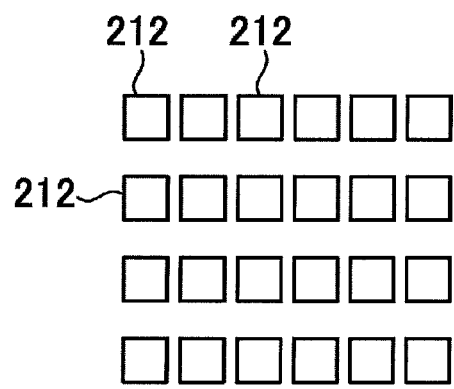
Figure 8C:
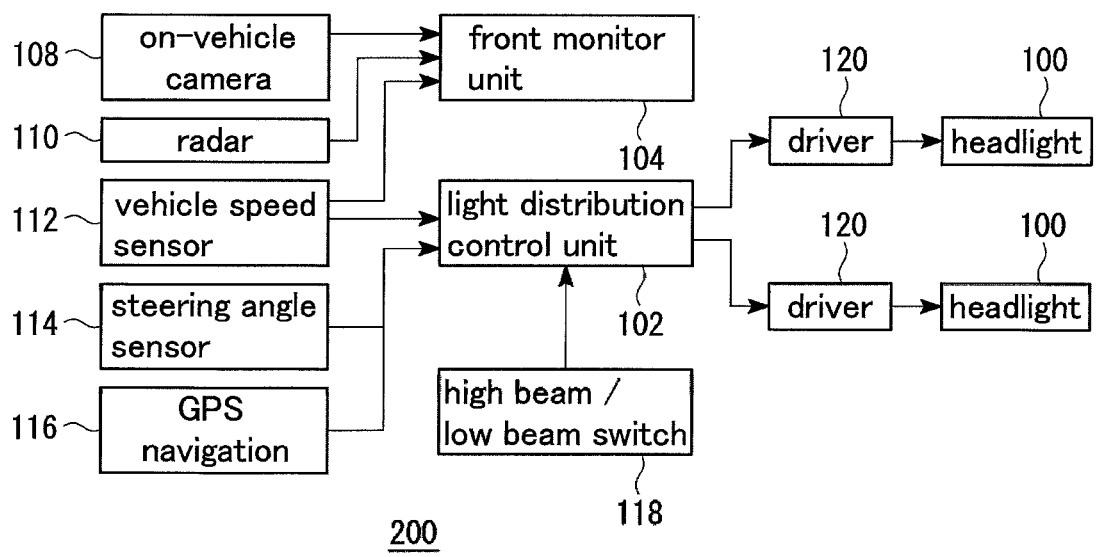

A headlight system may be constituted by employing a structure illustrated in FIG. 8C, the headlight 100 may be formed of an automotive lighting device containing above described light source, wire grid polarizer, reflector, phase shifter, liquid crystal element, projection lens, wherein light distribution control unit and drivers control the plurality of control regions in the liquid crystal element. It will be apparent that phase shift of ($\lambda$/2), ($\lambda$/4), etc. includes common difference of $\lambda$ (x integral).

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to showing of the superiority and inferiority of the invention. It should be understood that various changes, substitutions, and alterations could be made hereto without departing from the spirit and scope of the invention.

Although description has been made on preferred embodiments, these descriptions are not restrictive. For example, exemplified shape and color are only examples and are not restrictive. It will be apparent to those skilled in the art that various changes, modification, substitutions, improvements etc. are possible within the scope of appended claims.

What are claimed are:

1. An automotive headlight comprising:
   a light source for emitting light;
   a polarization beam splitter for receiving a light flux from the light source, and dividing the light flux into a first polarization and a second polarization;
   a liquid crystal element disposed to receive the first polarization and the second polarization, divided by the polarization beam splitter;
   a phase shifter disposed on optical axis of one of the first polarization and the second polarization, and aligning polarization axis directions of the first polarization and the second polarization; and
   an output side polarizer disposed on output side of the liquid crystal element,
   wherein illumination regions corresponding to respective control electrodes in the liquid crystal element can be controlled to shield light.

2. The automotive headlight according to claim 1, wherein said polarization beam splitter is a wire grid polarizer having a reflection plane which reflects said first polarization, and a transmission plane which transmits said second polarization, upon reception of a light flux.

3. The automotive headlight according to claim 2, wherein the first polarization reflected by the reflection plane of said polarization beam splitter is directed toward said liquid crystal element, further comprising:
   a reflector disposed at a position and in a sense, so as to receive said second polarization emitted from the transmission plane of said polarization beam splitter, and reflect it toward said liquid crystal element.

4. The automotive headlight according to claim 1, wherein said phase shifter is a ($\lambda$/2) phase shifter disposed on an optical path of said first or second polarization between said polarization beam splitter and said liquid crystal element.

5. The automotive headlight according to claim 3, wherein said phase shifter is a ($\lambda$/2) phase shifter disposed on an optical path of said second polarization between said polarization beam splitter and said reflector.

6. The automotive headlight according to claim 3, wherein said phase shifter is a ($\lambda$/2) phase shifter disposed on an optical path of said second polarization between said reflector and said liquid crystal element.

7. The automotive headlight according to claim 4, wherein said phase shifter is a ($\lambda$/2) phase shifter disposed on an optical path of said first polarization between the reflection plane of said polarization beam splitter and said liquid crystal element.

8. The automotive headlight according to claim 3, wherein said phase shifter is a first ($\lambda$/4) phase shifter disposed on an optical path of said second polarization between the transmission plane of said polarization beam splitter and said reflector, and a second ($\lambda$/4) phase shifter disposed on the optical path of said second polarization between said reflector and said liquid crystal element.

9. The automotive headlight according to claim 8, wherein said reflector has three dimensionally curved surface.

10. The automotive headlight according to claim 1, further comprising:
    an auxiliary polarizer disposed on a side of said liquid crystal element which is opposite to said output side polarizer.

11. The automotive headlight according to claim 1, wherein the first polarization and the second polarization experience, from emission from the light source to the injection into the liquid crystal element, identical number of reflection in same sense.

* * * * *